Nov. 28, 1944.   N. FLESCH   2,364,021
RAILWAY BRAKE
Filed May 25, 1942   2 Sheets-Sheet 1

INVENTOR.
Norman Flesch
BY
Atty.

Nov. 28, 1944.   N. FLESCH   2,364,021
RAILWAY BRAKE
Filed May 25, 1942   2 Sheets-Sheet 2
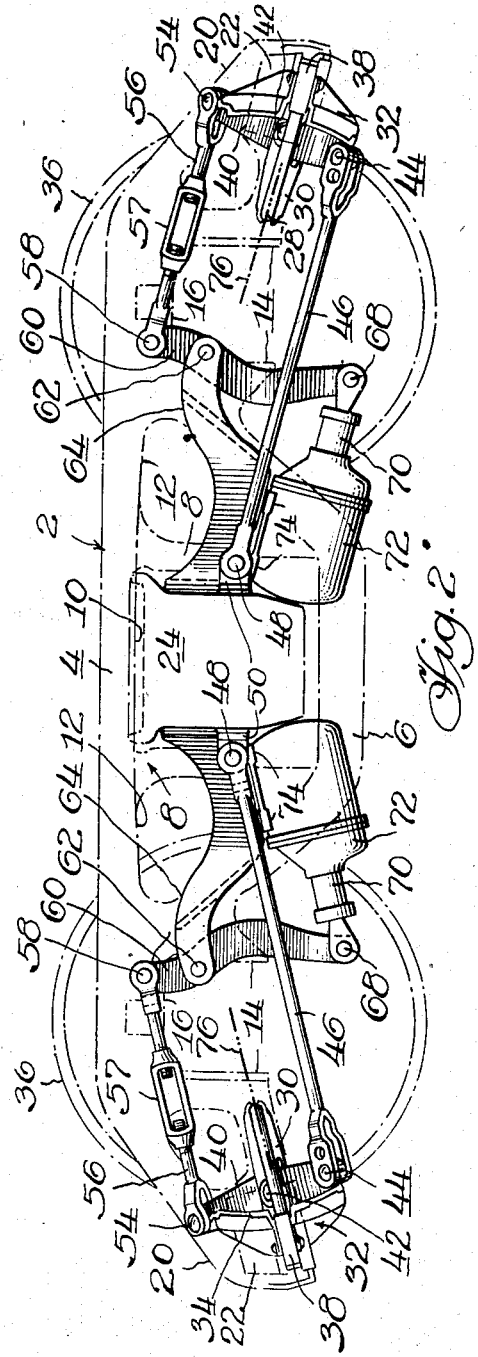
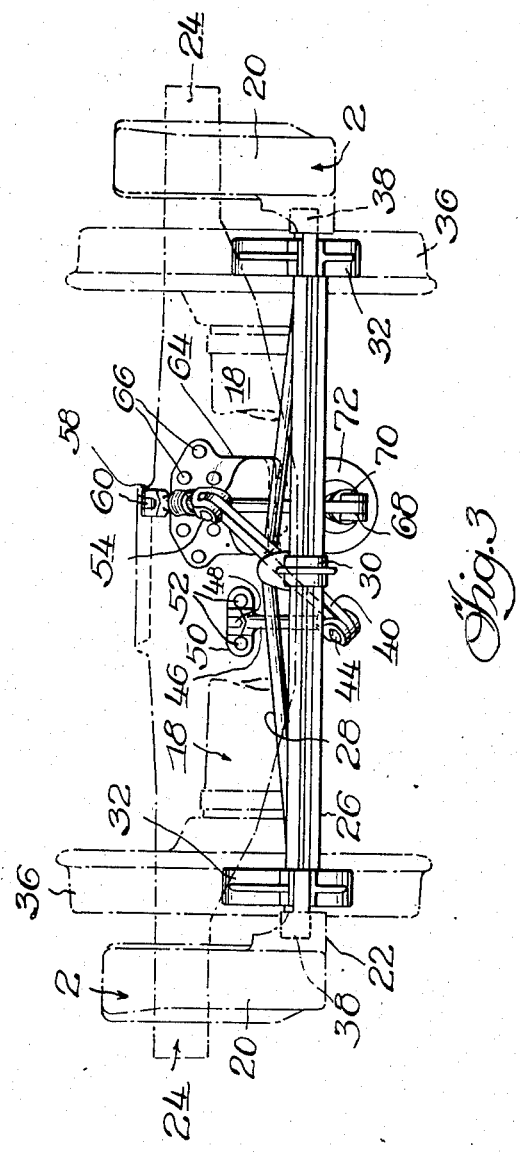
INVENTOR.
Norman Flesch
BY
Atty.

Patented Nov. 28, 1944

2,364,021

UNITED STATES PATENT OFFICE 2,364,021

RAILWAY BRAKE

Norman Flesch, Chicago, Ill., assignor to American Steel Foundries, Chicago, Ill., a corporation of New Jersey Application May 25, 1942, Serial No. 444,389

24 Claims. (Cl. 188—49)

My invention relates to brake rigging for a railway freight car truck and more particularly to a type of rigging in which brake beams are supported from the truck, each beam carrying a brake head at each end thereof formed and arranged for engagement with the periphery of an adjacent wheel. The conventional practice in brake rigging of the above described type has been to suspend the beams by means of brake hangers pivotally hung from hanger brackets on the truck. In recent years, however, a design of rigging has been utilized in which the ends of the beams have been slidingly supported from brackets or guides on the truck. My invention relates to an improvement in this latter type of rigging.

An object of my invention is to prevent twisting and resultant jamming of the ends of the beams in the truck frame guides.

Another object of my invention is the prevention of bending stresses in the strut or fulcrum of the truss type beam utilized in the above described arrangement.

These objects are accomplished by means of a brake arrangement in which the cylinder and the pull rods connected to the truck lever fulcrumed in the strut of the brake beam lie in planes parallel to the plane of application of the beam. By this arrangement all of the forces on the brake rigging and especially on the brake beams are in planes parallel to the plane in which the beam moves to and from the wheel and axle assembly, whereby jamming of the beam in the truck frame guides and twisting or bending of the strut of the beam are substantially reduced as will be clearly apparent to those skilled in the art.

A specific object of my invention is to design brake rigging for a railway car truck, in which a brake beam is slidingly supported from the truck frame outwardly of each supporting wheel and axle assembly, said beam being applied to said assembly by means of a lever fulcrumed in the strut of said beam, said lever being pivotally connected at opposite ends thereof to pull rods, the lower rod being pivotally connected to the bolster of the truck and the upper rod being operatively connected to an air cylinder hung from said bolster, said cylinder and said pull rods lying in planes parallel to the plane of application of said brake beam.

Still another object of my invention is a novel bracket secured to each side of the bolster, said bracket supporting an air cylinder on the bottom thereof and comprising an arm affording a fulcrum for a dead truck lever, said dead truck lever being operatively connected to said cylinder and to a truck lever fulcrumed in the adjacent brake beam.

In the drawings,

Figure 2 is a side elevation of the arrangement shown in Figure 1, and Figure 3 is an end view of the structure shown in Figures 1 and 2.

Figure 1:
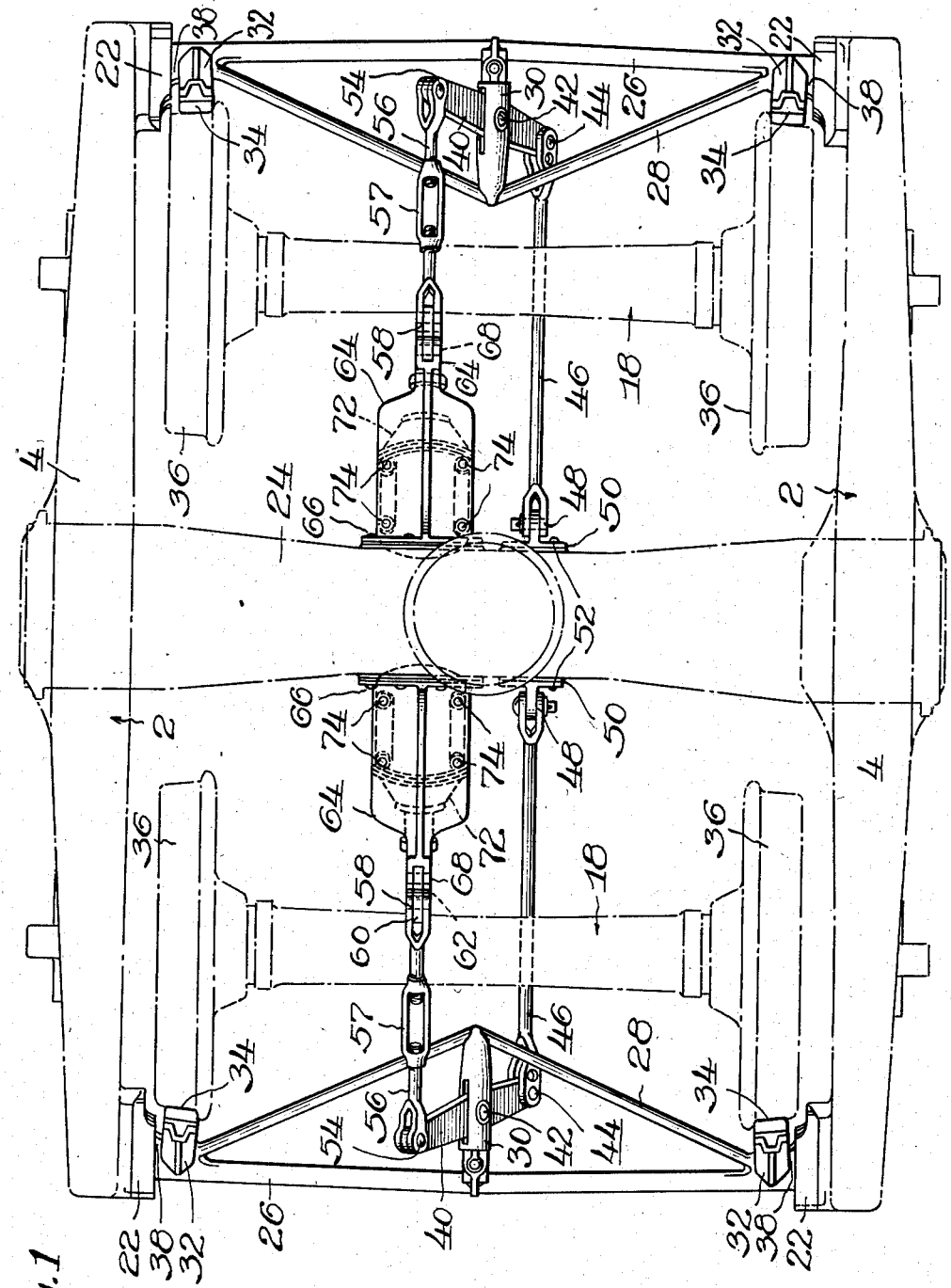
Figure 1 is a top plan view of a railway car truck embodying my novel brake arrangement.

In each of said figures certain details may be omitted where they are more clearly seen in other views.

Describing my invention in detail, the truck frame comprises the spaced side frames 2, 2, each of said frames having a compression member 4, a tension member 6 and spaced columns 8, 8, defining therewith a bolster opening 10 and spaced windows 12, 12. Adjacent each end of each side frame 2 are formed spaced pedestal jaws 14, 14, defining a pedestal opening 16 affording a connection to a journal box (not shown), the journal boxes receiving in the usual manner the journal ends of the associated wheel and axle assembly generally designated 18. Outwardly of each pedestal opening 16 is formed an extension 20 comprising a bracket 22 serving a purpose hereinafter more fully described. The side frames 2, 2 are connected by a bolster 24 of usual form, said bolster being received at opposite ends thereof within respective bolster openings 10, 10 and supported from the frames 2, 2 in the usual manner.

Outwardly of each wheel and axle assembly 18 is a brake beam comprising a compression member 26, a tension member 28, and a strut 30 connected at opposite ends thereof to the members 26 and 28 in the usual manner. Secured to each end of the brake beam is a brake head 32 carrying a brake shoe 34 for engagement with the periphery of the adjacent wheel 36 of the wheel and axle assembly 18. The beam is projected outwardly of each head as at 38 and the projection 38 is received within the adjacent bracket 22 as will be understood from a consideration of Figures 1 and 3.

A dead truck lever 40 is fulcrumed at 42 in each strut 30. Pivotally and adjustably connected at 44 to the lower end of each lever 40 is a pull rod 46, said pull rod underlying the axle of the adjacent wheel and axle assembly 18 and being pivotally connected at 48 to a bracket 50 secured to the side of the bolster 24 as at 52. The upper end of each lever 40 is pivotally connected at 54 to one end of a pull rod 56. It may be noted that the pull rod 56 is formed of two parts, connected by a turnbuckle 57 in order to make the pull rod adjustable as will be clearly apparent to those skilled in the art. The pull rod 56 is pivotally connected at its opposite end as at 58 to the upper end of the vertically disposed dead truck lever 60, the dead truck lever 60 being pivotally connected intermediate its ends at 62 to the bracket 64 secured as at 66, 66 to the side of the bolster 24, and the lever 60 is pivotally connected at its lower end as at 68 to the piston rod 70 projecting from the air cylinder 72, said cylinder being secured as at 74, 74 to the bottom of the bracket 64. It may be noted that the brackets 64, 64 are secured to the bolster 24 at opposite points thereon, whereby the reactions from the cylinders 72, 72 will be neutralized and will not cause twisting of the bolster 24. Likewise, and for a similar reason, the pull rods 46, 46 are connected by means of the brackets 50, 50 to opposed points at opposite sides of the bolster 24.

During actuation of the brake rigging it will be apparent that the brake beams will move in the diagonal planes indicated at 76, 76 in Figure 2 and it will also be apparent that each cylinder 72, as well as the associated pull rods 46 and 56, lie in planes parallel to the plane of application 76 of the associated brake beam. For this reason the actuating forces transmitted to the brake beam will operate in planes parallel to the plane 76 and thus twisting of the extensions 38, 38 within the brackets 22, 22 will be prevented and likewise bending stresses on the struts 30, 30 will be prevented.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a brake arrangement, a truck comprising spaced side frames and an intervening bolster, supporting wheel and axle assemblies, aligned brackets secured to opposite sides of said bolster, a cylinder secured to each bracket, brake beams supported from said frame, friction means on each beam for engagement with the wheels of the associated assembly, and actuating means for each beam, said last-mentioned means comprising a lever fulcrumed intermediate its ends in said beam, a lever fulcrumed intermediate its ends from the associated bracket, a pull rod connecting the upper ends of said levers, a pull rod connecting the lower end of said first-mentioned lever to said bolster, and a connection between each cylinder and the lower end of the associated bracket-fulcrumed lever.

2. In a brake arrangement, a car truck comprising spaced side frames and a bolster, a supporting wheel and axle assembly, a bracket on said bolster, power means secured to the bottom of the bracket, a truck lever fulcrumed intermediate its ends from said bracket and connected at its lower end to said power means, a brake beam supported from said side frames, and an operative connection between said lever and said beam, said connection comprising a lever fulcrumed in said beam, a pull rod connected at opposite ends thereof to respective levers, and a pull rod connected at opposite ends thereof to said bolster and to said last-mentioned lever.

3. In a brake arrangement, a truck frame, brake beams supported therefrom and actuating means for each beam, said means comprising a truck lever fulcrumed in said beam, a truck lever fulcrumed intermediate its ends from said frame, an operating rod connecting the upper extremities of said levers, a rod connecting said first-mentioned lever to said frame, and a power cylinder device having a piston rod directly connected to the lower end of said frame-fulcrumed lever, said rods lying in planes parallel to the plane of application of said beam.

4. In a brake arrangement, a truck frame, brake beams supported therefrom and actuating means for each beam, said means comprising a truck lever fulcrumed in said beam, a truck lever fulcrumed intermediate its ends from said frame, an over-axle operating rod connecting said levers, means connecting said first-mentioned lever to said frame, and a power cylinder device having a piston rod directly connected to said frame-fulcrumed lever, said rods and said power means lying in respective planes parallel to the plane of application of the beam.

5. In a brake arrangement, a truck frame, a supporting wheel and axle assembly, a bracket secured to said frame at one side of said assembly, power means supported from said bracket, a lever fulcrumed intermediate its ends from said bracket and operatively connected to said means, and braking means suspended from said frame at the opposite side of said assembly for engagement with the wheels of said assembly and operatively connected to said lever, said power means acting in a plane parallel to the plane of application of said beam.

6. In a brake arrangement, a car truck comprising spaced side frames and a bolster, a supporting wheel and axle assembly, a bracket on said bolster disposed at one side of the axis of said assembly, power means secured to the bottom of said bracket, a truck lever fulcrumed to said bracket, a brake beam supported from said frames, an operative connection between said lever and said power means, a dead truck lever fulcrumed to said beam, said last-mentioned lever being disposed at the opposite side of said axis, and a pull rod interconnecting said levers.

7. In a brake arrangement, a vehicle frame, spaced supporting wheel and axle assemblies, brake beams slidably mounted at the ends thereof from said frame outwardly of said assemblies, each of said beams being mounted in a plane inclined with respect to the horizontal and being movable in said plane toward and away from the adjacent assembly, and actuating means for each beam comprising a system of interconnected pull rods and levers associated therewith, one end of said system being connected to said frame and power means on said frame operatively connected to the opposite end of said system, all of said pull rods and said power means lying in planes parallel with the plane of movement of the associated beam.

8. In a brake arrangement, a vehicle frame, spaced supporting wheel and axle assemblies, brake beams slidably mounted at their ends from said frame outwardly of said assemblies, each of said beams being mounted in a plane inclined with respect to the horizontal and being movable in said plane toward and away from the adjacent assembly, and actuating means for each beam comprising a system of interconnected pull rods and levers, one end of said system being connected to said frame, a dead lever at the opposite end of said system and fulcrumed from said frame, and power means associated with said dead lever, each of said pull rods lying in a plane parallel to the plane of movement of the associated beam.

9. In a brake arrangement, a truck frame, a supporting wheel and axle assembly, a bracket secured to said frame, power means supported from the bottom of said bracket, a lever fulcrumed intermediate its ends from said bracket at one side of the axis of said assembly and operatively connected to said means, and braking means at the opposite side of said axis for engagement with the wheels of said assembly and operatively connected to said lever by means of an over-axle operating rod.

10. In a brake arrangement, a vehicle frame, a supporting wheel and axle assembly, a brake beam extending transversely of said frame, said beam being slidably mounted at the ends thereof in brackets on said frame and said beam lying in a plane inclined with respect to the horizontal, and actuating means associated with said beam and acting entirely in planes parallel with the first-mentioned plane whereby twisting of said beam in said brackets is substantially prevented.

11. In a brake arrangement, a truck frame, supporting wheel and axle assemblies, brake beams supported from said frame, and actuating means for each beam, said means comprising a truck lever fulcrumed in said beam, operating rods connected to opposite ends of said lever, one of said rods extending beneath said assembly and being connected to said frame, and power means operatively connected to the other of said rods, said lever being disposed at the longitudinal center line of the truck frame.

12. In a brake arrangement, a vehicle frame comprising spaced side members and an intervening transverse member, a supporting wheel and axle assembly, fulcrum means on said transverse member, a truck lever fulcrumed intermediate its ends from said means, power means supported from said transverse member and operatively connected to the lower end of said lever, a brake beam supported from said side members, and an operative connection between said lever and said beam, said connection comprising a lever fulcrumed from said beam, a pull rod connected at opposite ends thereof to respective levers, and a pull rod connected at opposite ends thereof to said transverse member and to said last-mentioned lever.

13. In a brake arrangement for a vehicle comprising a vehicle frame and a supporting wheel and axle assembly, brake means slidably supported from said frame in a plane inclined with respect to the horizontal and movable in said plane toward and away from said assembly, and actuating means for said brake means comprising a system of interconnected rods and levers, each of said rods lying in a plane parallel to said first-mentioned plane.

14. In a brake arrangement, a vehicle frame, a supporting wheel and axle assembly, a truck lever fulcrumed intermediate its ends from said frame at one side of said assembly, power means associated with the lower end of said lever, a brake beam supported from said frame at the opposite side of said assembly, a lever fulcrumed from said beam, a pull rod connected at opposite ends thereof to respective levers, and a pull rod connected at opposite ends thereof to said frame and to the last-mentioned lever.

15. In a brake arrangement, a vehicle frame comprising spaced side members and an intervening transverse member, supporting wheel and axle assemblies, power means secured at opposite sides of said transverse member, brake beams supported from said frame, and actuating means for each beam, said means comprising a lever fulcrumed intermediate its ends from said beam, a lever fulcrumed intermediate its ends from said frame, a pull rod connecting the lower end of the first-mentioned lever to said transverse member, a pull rod connecting the upper ends of said levers, and an operative connection between the lower end of said frame-fulcrumed lever and the adjacent power means.

16. In a brake arrangement for a vehicle comprising a vehicle frame and a supporting wheel and axle assembly, a lever fulcrumed intermediate its ends from said frame at one side of said assembly, power means associated with the lower end of said lever, friction means supported from said frame at the opposite side of said assembly for braking application thereto, a lever fulcrumed to said friction means, a pull rod connected at opposite ends thereof to respective levers, and a pull rod connected at opposite ends thereof to said frame and to the last-mentioned lever.

17. In a brake arrangement for a vehicle comprising a vehicle frame and a supporting wheel and axle assembly, a truck lever fulcrumed from said frame at one side of said assembly, power means operatively associated with the lower extremity of said lever, braking means supported from said frame at the opposite side of said assembly for braking application thereto, a lever fulcrumed to said braking means, a pull rod connected at opposite ends thereof to the upper extremities of respective levers, and a pull rod connected at opposite ends thereof to said frame and to the last-mentioned lever.

18. In a brake arrangement, a vehicle frame, a supporting wheel and axle assembly, a brake beam slidably supported from said frame in a plane inclined with respect to the horizontal, said beam being movable in said plane toward and away from said assembly, and actuating means for said beam comprising a system of interconnected pull rods and levers, one end of said system being connected to the frame, and a power cylinder mounted on the frame and connected to the opposite end of said system, said rods and said cylinder being disposed in planes parallel to the first-mentioned plane.

19. In a brake arrangement, a vehicle frame, a supporting wheel and axle assembly, a brake beam slidably supported from said frame in a plane inclined with respect to the horizontal, said beam being movable in said plane toward and away from said assembly, and actuating means for said beam comprising a system of interconnected pull rods and levers, one end of said system being connected to the frame, a dead lever at the opposite end of said system, said dead lever being fulcrumed from said frame, and power means operatively associated with said dead lever, said pull rods lying in planes parallel to the first-mentioned plane.

20. In a brake arrangement, a vehicle frame, a supporting wheel and axle assembly, a brake beam slidably supported from said frame in a plane inclined with respect to the horizontal and passing approximately through the axis of said assembly, said beam being movable in said plane toward and away from said assembly, a lever furcrumed from said beam, a pull rod connecting said lever to said frame, a cylinder lever supported from said frame, a pull rod interconnecting said levers, and a power cylinder having a piston rod connected to said cylinder lever, said pull rods and said cylinder lying in planes parallel to the first-mentioned plane.

21. In a brake arrangement, a vehicle frame, a supporting wheel and axle assembly, a brake beam slidingly supported from said frame in a plane inclined with respect to the horizontal and passing approximately through the axis of said assembly, said beam being movable in said plane toward and away from said assembly, means connecting said lever to said frame, a cylinder lever supported from said frame, a pull rod interconnecting said levers, and a power cylinder having a piston rod connected to said cylinder lever, said connecting means, said pull rod, and said cylinder lying in respective planes parallel to the first-mentioned plane.

22. In a brake arrangement, a vehicle frame, a supporting wheel and axle assembly, a brake beam slidingly supported from said frame, said beam lying in a plane inclined with respect to the horizontal and passing approximately through the axis of said assembly, a lever fulcrumed from said beam, a pull rod connecting said lever to said frame, a dead lever fulcrumed from said frame, a pull rod connecting said levers to each other, and power means operatively connected to the dead lever, said pull rods lying in planes parallel with the first-mentioned plane.

23. In a brake arrangement, a vehicle frame, a supporting wheel and axle assembly, a brake beam slidingly supported from said frame, said beam lying in a plane inclined with respect to the horizontal and passing approximately through the axis of said assembly, a lever fulcrumed from said beam, means connecting said lever to said frame, a dead lever fulcrumed from said frame, a pull rod interconnecting said levers, and power means operatively connected to said dead lever, said connecting means and said pull rod lying in respective planes parallel with the first-mentioned plane.

24. In a brake arrangement, a vehicle frame, a supporting wheel and axle assembly, a brake beam slidably supported from said frame in a plane inclined with respect to the horizontal, said beam being movable in said plane toward and away from said assembly for braking application thereto, and actuating means for said beam comprising a system of interconnected pull rods and levers, said actuating means being so formed and arranged that all braking forces exerted thereby operate in planes parallel to said first-mentioned plane.

NORMAN FLESCH.